US012710113B2

(12) United States Patent
Pereira Ferreira et al.

(10) Patent No.: US 12,710,113 B2
(45) Date of Patent: Aug. 18, 2026

(54) HYDRAULIC ACTUATION SYSTEM FOR DIVERLESS BELL MOUTH

(71) Applicant: Petróleo Brasileiro S.A. - Petrobras, Rio de Janeiro (BR)

(72) Inventors: Roberto Pereira Ferreira, Rio de Janeiro (BR); Renato Ramos Gonzaga, Niterói (BR); Guilherme De Souza Aires, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 524 days.

(21) Appl. No.: 17/900,366

(22) Filed: Aug. 31, 2022

(65) Prior Publication Data

US 2023/0073977 A1 Mar. 9, 2023

(30) Foreign Application Priority Data

Sep. 1, 2021 (BR) ...................... 10 2021 017362 9

(51) Int. Cl.
*F16L 1/20* (2006.01)
*F16L 37/127* (2006.01)

(52) U.S. Cl.
CPC ............... *F16L 1/20* (2013.01); *F16L 37/127* (2013.01)

(58) Field of Classification Search
CPC .... E21B 17/017; E21B 17/085; E21B 19/004; F16L 1/20; F16L 37/127
See application file for complete search history.

(56) References Cited

U.S. PATENT DOCUMENTS 3,528,343 A 9/1970 Sherwood
4,712,620 A * 12/1987 Lim ...................... E21B 17/085 166/359
5,947,642 A * 9/1999 Teixeira ................ F16L 37/096 405/195.1
2010/0133811 A1* 6/2010 Taylor ................. E21B 17/0465 285/24
2011/0094748 A1* 4/2011 Reddy ..................... E21B 17/06 166/343
2012/0292037 A1* 11/2012 Gutierrez ............ E21B 43/0122 166/341
2015/0143987 A1 5/2015 Roberts et al.
2015/0337607 A1* 11/2015 Latimer ................ E21B 19/004 166/345
2021/0348449 A1 11/2021 Reis et al.

FOREIGN PATENT DOCUMENTS

BR 102018011452 A2 12/2019
EP 3722620 A1 10/2020
WO WO-2019232605 A1 * 12/2019 ............. B63B 21/04

* cited by examiner

*Primary Examiner* — Amber R Anderson
*Assistant Examiner* — Stacy N Lawson
(74) *Attorney, Agent, or Firm* — Morrison & Foerster LLP

(57) ABSTRACT

The present invention proposes a device capable of allowing remote unlocking operation and remaining compatible with the possibility of a mechanical and manual drive. The device is a hydraulic actuator (2) with hydraulic power supply through the lines coming from the platform. It also has a handle (4) for manual driving.

The invention allows cost reduction with PLSVs (waiting for diving and standby weather) and with diving activities themselves, in addition to greater agility in pull-out operations. Further, it promotes the diminishment of the need for diving and, consequently, lower MHRE (Man-Hour of risk exposure).

6 Claims, 6 Drawing Sheets

HYDRAULIC ACTUATION SYSTEM FOR DIVERLESS BELL MOUTH

CROSS-REFERENCE TO RELATED APPLICATION

This application claims priority to Brazilian Application No. 10 2021 017362 9, filed on Sep. 1, 2021, and entitled "HYDRAULIC ACTUATION SYSTEM FOR DIVERLESS BELL MOUTH," the disclosure of which is incorporated herein by reference in its entirety.

FIELD OF THE INVENTION

The present invention is based on the development of a solution for the automatic actuation to unlock the bend stiffener in pull-out operations of flexible risers and umbilicals.

DESCRIPTION OF THE STATE OF THE ART

To protect flexible risers and umbilicals, mobile bend stiffeners are used to maintain their integrity during their useful life. These stiffeners are attached to structures on the platform's lower riser counter (FPSO), called Bell Mouths. Divers are usually required to perform both the locking (pull-in) and the unlocking (pull-out) of the bend stiffener. Recently, the Diverless Bell Mouth (DLBM) was developed (BR 10 2018 011452-2) which, due to its mechanical characteristics, does not require diving for pull-in activities. However, there is still a lack of a mechanism that allows the pull-out operation without the need for diving.

Until the development of the DLBM (Diverless Bell Mouth), all the work of locking and unlocking the bend stiffener depended on the performance of divers. With the development of DLBM, already applied in some projects such as MERO 1 and MERO 2, the problem of the locking (pull-in) was solved, through mechanical changes in the structure of the bell mouth and the helmet (a structure that supports the bend stiffener). However, the pull-out operation still depends on the manual actuation of divers to release the locks, remaining the need for an automatic remote unlocking mechanism.

Document U.S. Pat. No. 3,528,343A discloses a hydraulic cylinder and piston designed to move a load to a desired position and lock in that position until it is released, even if the fluid pressure to the cylinder may be stopped, the locking being effected by frictional management of one or more sleeves with the piston rod, under the influence of one or more spring-loaded sleeve closing rings, with the additional provision of one or more protective devices designed to prevent communication with the rings and sleeves from compressive loads in excess of a predetermined maximum.

Document US20150143987A1 discloses a drive system that includes a cylinder, a first piston, and a second piston. The cylinder may have a first portion for holding or retaining a first fluid, and a second portion for holding or retaining a second fluid. The first piston may be operatively coupled to, or in fluid communication with, the first fluid, and the second piston may be operatively coupled to, or in fluid communication with, the second fluid. The second piston may be disposed between the first cylinder portion and the second cylinder portion. The addition or removal of the second fluid relative to the second portion of the cylinder can drive the first piston and second piston.

Document EP3722620A1 discloses a hydraulically operated subsea locking cylinder with a function for long term force retention. The device is based on the basic properties of a cylinder, preferably a differential cylinder, operated with a pressure fluid such as hydraulic oil. With such a cylinder, the fastening (by the longitudinal movement of a piston rod) and the accumulation of the necessary fastening force by hydraulic fluid pressure are achieved in a simple way.

The presented priorities do not disclose the ability to operate in the conditions of locking (pull-in) and unlocking (pull-out) of bend stiffeners, connected to Diverless Bell Mouths (DLBM). Thus, the State of the Art mentioned above does not have the unique features of this invention that will be presented in detail below.

OBJECTIVE OF THE INVENTION

It is an objective of the invention to provide a hydraulic drive system capable of releasing the locking pawls of the bend stiffener in pull-out operations of flexible risers and umbilicals, as well as allowing local driving and not preventing mechanical driving in the pull-in.

BRIEF DESCRIPTION OF THE INVENTION

The present invention proposes a device capable of unlocking a piece of equipment without manual action. Additionally, the proposed system allows the operation originally by DLBM for locking without the need for hydraulic actuation; that is, this system does not interfere with the normal functioning of the DLBM. The device is a hydraulic actuator with hydraulic power supply by lines coming from the platform. The proposed system differs from traditional subsea hydraulic actuators by dispensing with the compensation chamber. It also has a handle for manual driving.

BRIEF DESCRIPTION OF DRAWINGS

The present invention will be described in more detail below, with reference to the attached figures which, in a schematic form and not limiting the inventive scope, represent examples of its embodiment. In the drawings, there are.

DETAILED DESCRIPTION OF THE INVENTION

There follows below a detailed description of a preferred embodiment of the present invention, by way of example and in no way limiting. Nevertheless, there will become clear to a person skilled in the art, from reading this description, possible further embodiments of the present invention, still comprised by the essential and optional features below.

Figure 1:
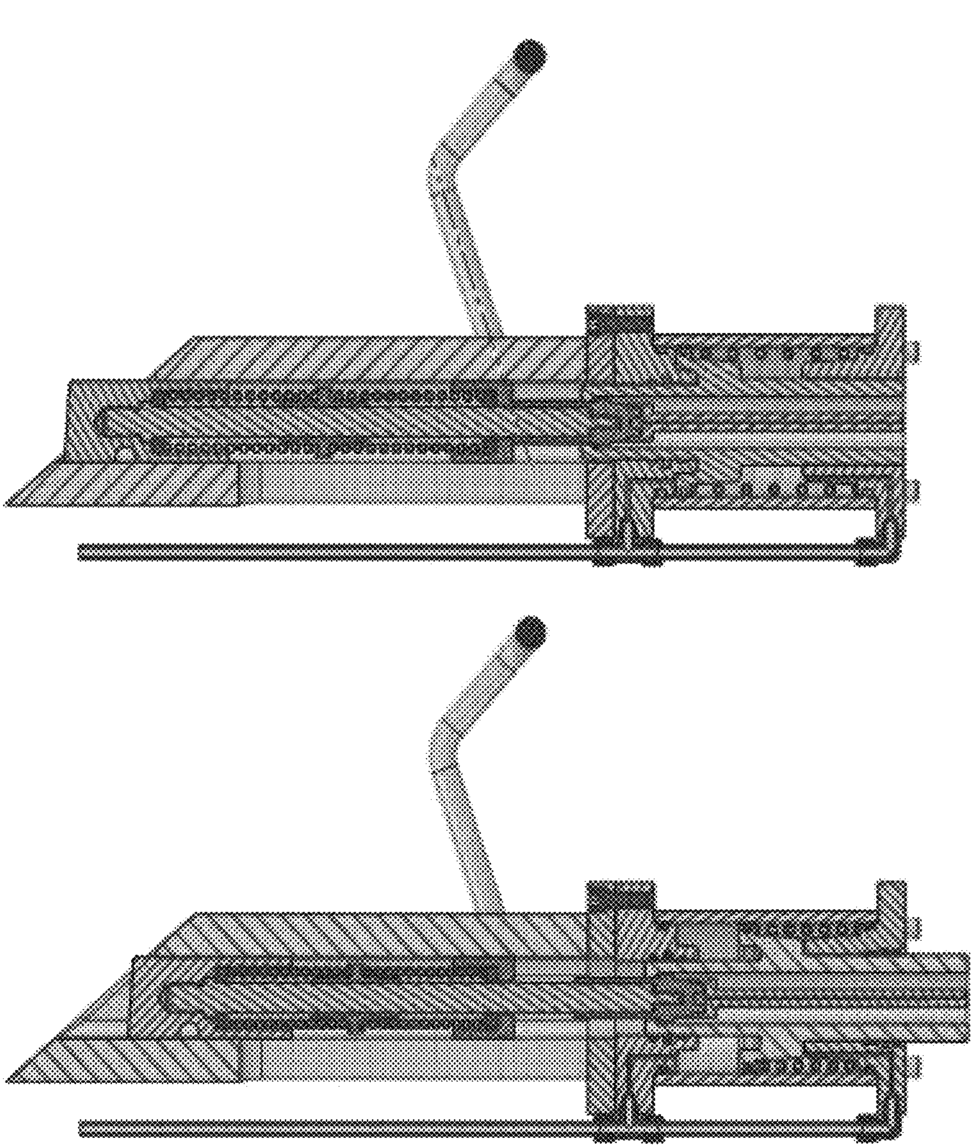
FIG. 1, which illustrates the hydraulic drive system of the present invention.
Figure 2:
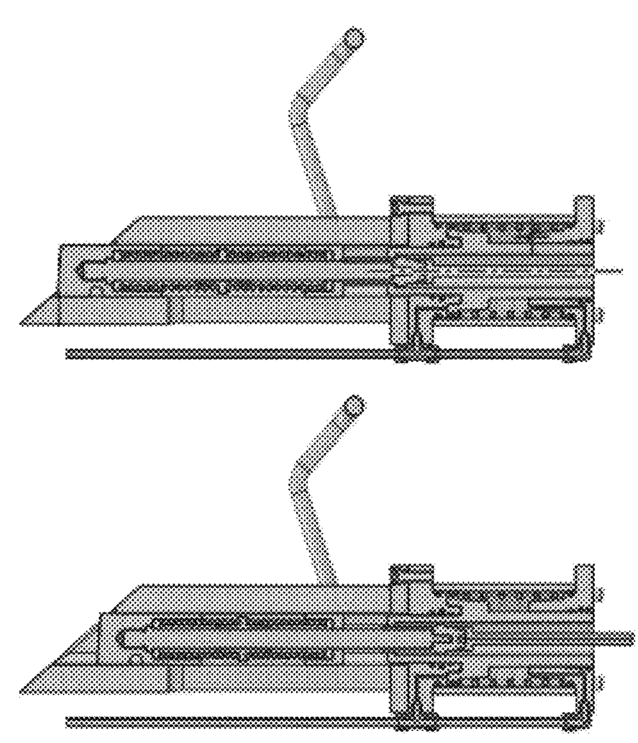
FIG. 2, which illustrates the mechanical drive mode in which the bend stiffener moves the pawls and locks.
Figure 3:
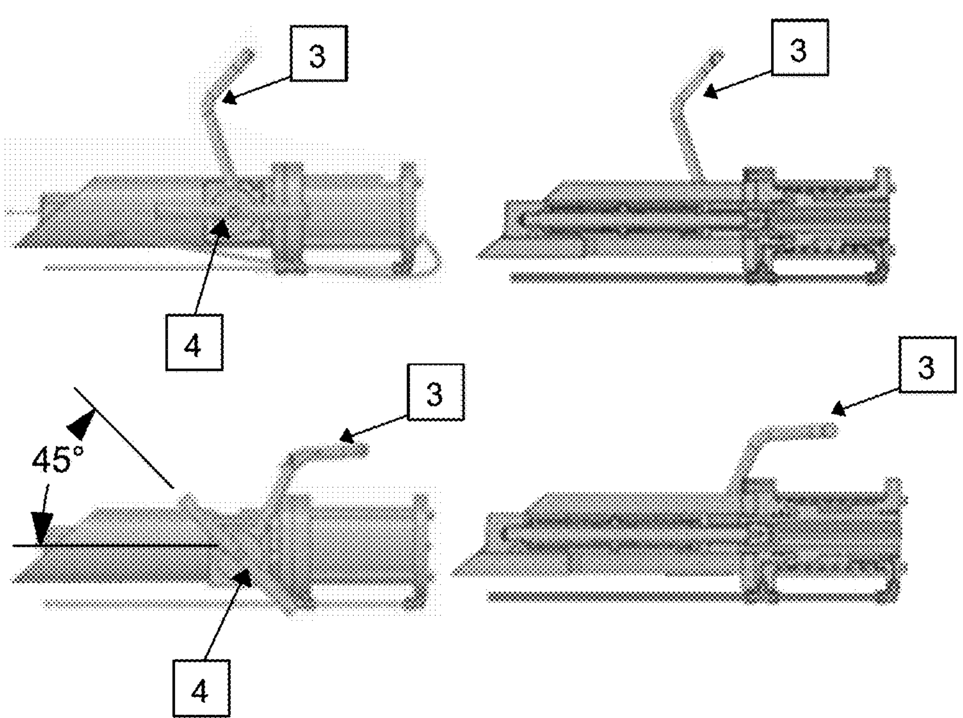
FIG. 3, which illustrates the manual driving mode with diving. The removable handles (3) are identified by arrows, in addition to a second switch-type handle (4) that allows driving from the outside (by a diver).

The invention comprises the development of a hydraulic drive system (FIG. 1) capable of releasing, without the need for divers, the locking pawls of the bend stiffener in pull-out operations of flexible risers and umbilicals, but which also allows driving by two more modes: mechanical (FIG. 2) and manual (FIG. 3).

The proposed system will be applied in bell mouths of three sizes: 32" (81.28 cm) for umbilicals, 46" (116.84 cm) and 48" (121.92 cm) for flexible risers for production, service, and gas or water injection. The drive mechanism comprises a single-acting hydraulic actuator for each bell mouth locking pawl. A hydraulic circuit interconnects the actuators of each bell mouth with the platform driving system—FPSO (HPU-hydraulic power unit), by means of an arrangement of tubings (located on the upper and lower riser balconies) and an umbilical installed on the side of the platform. The number of actuators for each bell mouth depends on its diameter.

Figure 4:
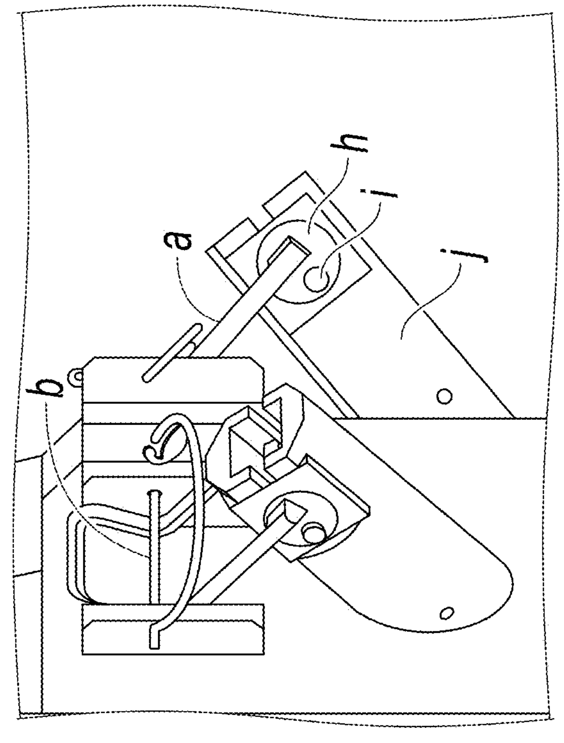
FIG. 4, which illustrates components of the original DLBM locking mechanism, being represented: handle (a), clamp (b), reaction block (c), shaft (d), centralizer (e), springs (f), pawls (g), eccentric (h), pin (i), pawl holder (j).
Figure 4:
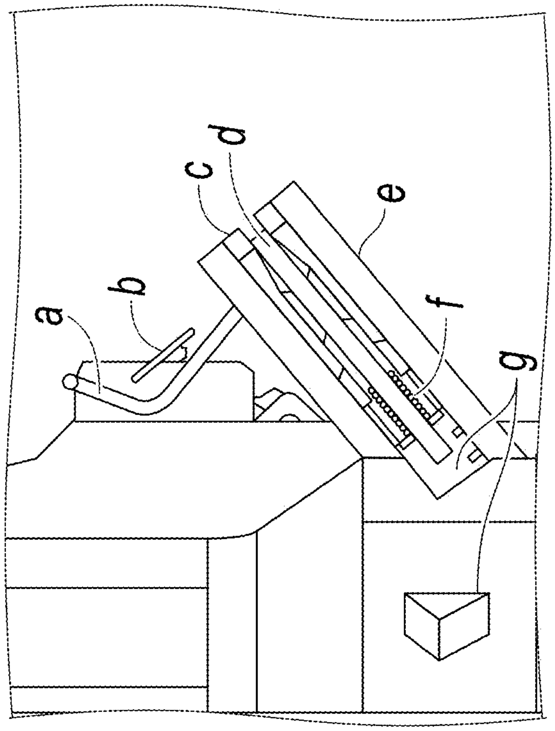
Figure 5:
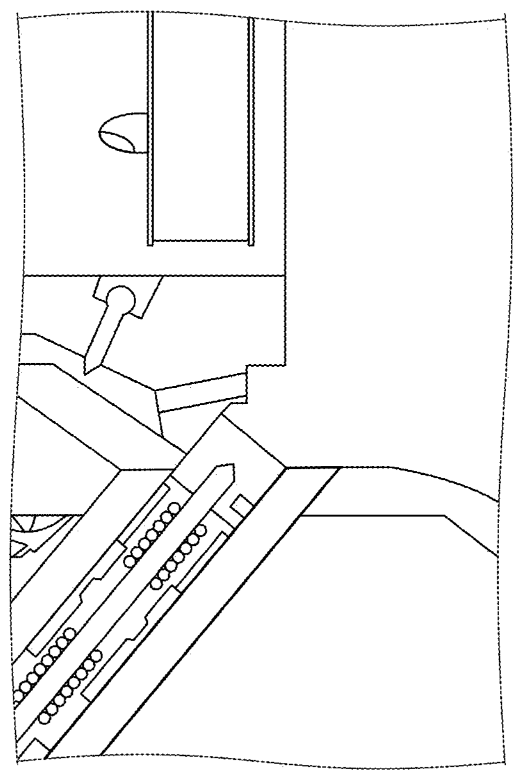
FIG. 5, which illustrates the operation of the DLBM, representing the entry of the helmet into the DLBM and the seat on the pawl.
Figure 5:
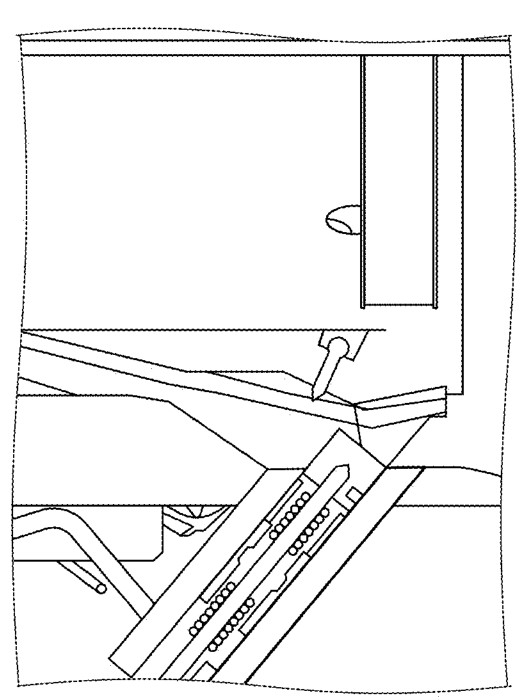

In the original locking (pull-in) mechanism of the Diverless Bell Mouth (DLBM), illustrated in FIG. 4, the pawl is the component on which the helmet of the bend stiffener (bend stiffener) is seated, and is responsible for transferring incoming loads to the DLBM body. The other internal components, such as springs, shaft, centralizer, form a set with the pawl, which allows the axial displacement when mechanically driven and the automatic return when the external driving force ceases. A reaction block is connected to the handle by means of an eccentric mechanism, allowing the manual retraction of the pawl by a diver's action. It also serves to anchor the end of the springs, and further as a guide for the rods. In the operation of the DLBM, represented in FIG. 5, the movement of the helmet retracts the locking pawl by means of a mechanical contact.

Figure 6:
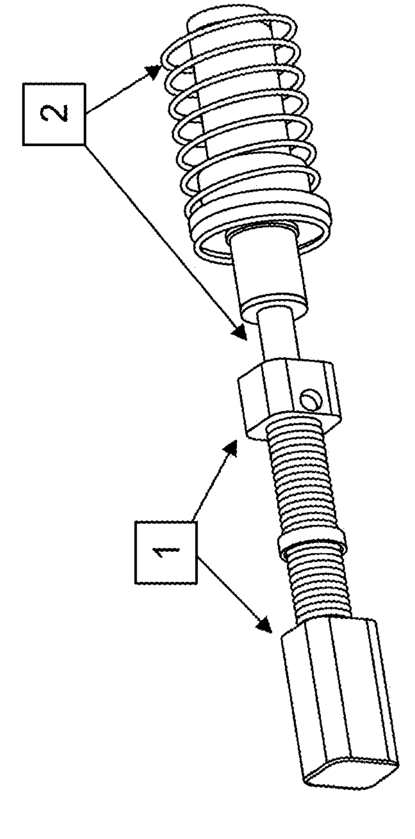
FIG. 6, which illustrates the original components of the DLBM (1), together with the hydraulic actuator set (2) and removable handles (3), object of this invention.
Figure 6:
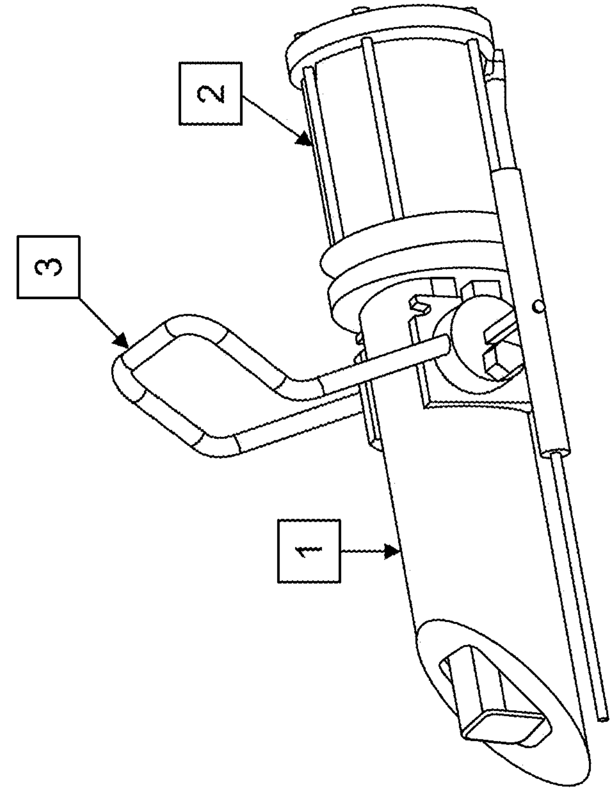

The DLBM operating mode with hydraulic actuation, object of this invention, is designed with the main objective of allowing the unlocking of the pawls that support the bend stiffener, during the pull-out operation. A single-acting spring-return hydraulic actuator is incorporated into the block that contains the original DLBM locking mechanism. FIG. 6 shows the original components of the DLBM (1), together with the hydraulic actuator (2), wherein the external view is shown on the left, and the internal components of both are shown on the right.

The adopted configuration uses a regenerative circuit, in which the hydraulic fluid inlet and outlet are connected in the same line, so that the piston moves by difference in areas between smaller and larger diameter rods. This configuration allows the use of a single hydraulic line for driving, without the need for a compensation system and without the entry of seawater into the cylinder.

It should be highlighted that the incorporation of the hydraulic cylinder does not interfere with the original operating mode of the DLBM for the pull-in operation. The same independence of drives occurs when the retraction of the pawls is performed by the diver, by using the handle for a manual drive.

Figure 7:
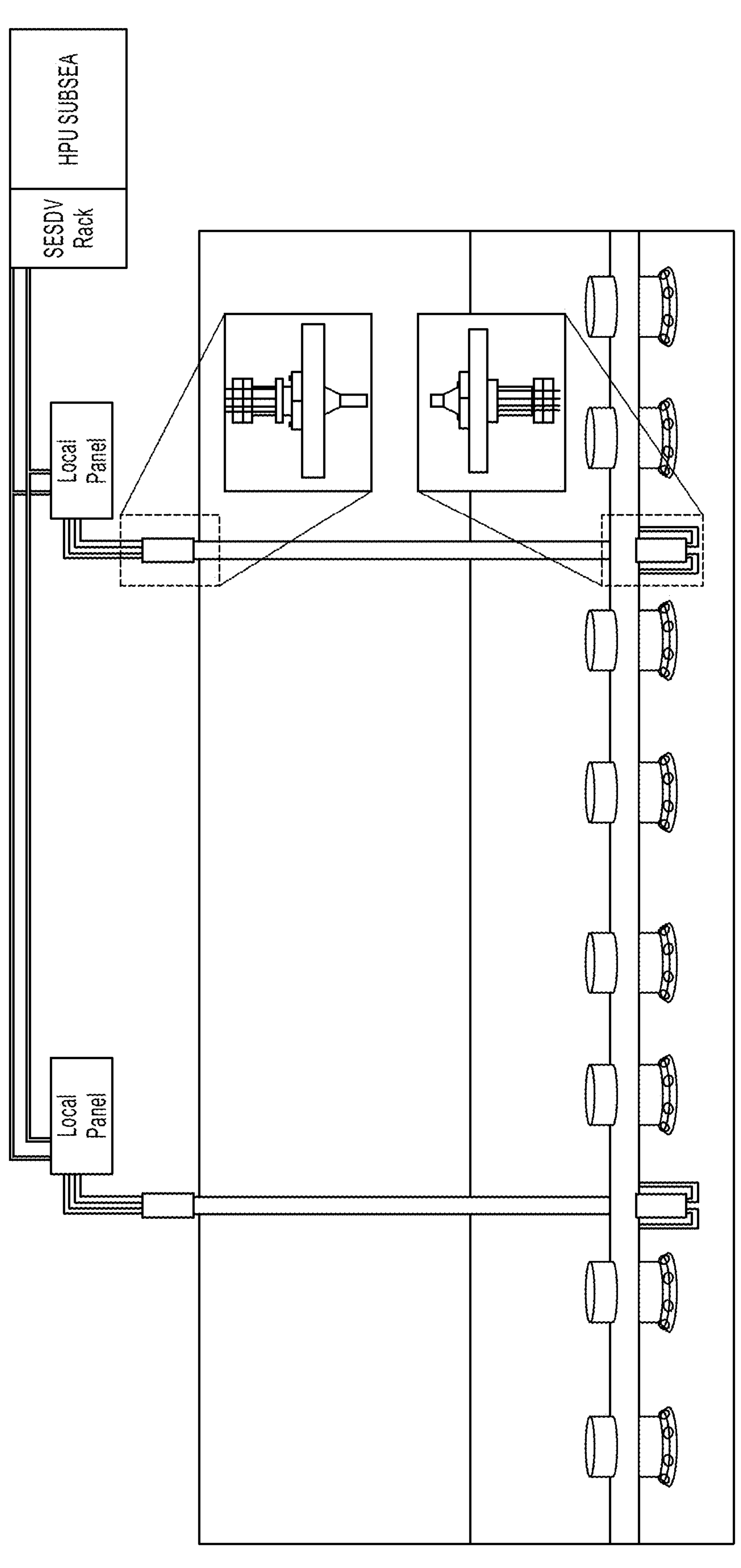
FIG. 7, which illustrates the general diagram of the hydraulic circuit, object of this invention.

In order to allow the path of the hydraulic circuit to the topside of the platform, as illustrated in FIG. 7, there has been used a branch of EHU (electro-hydraulic umbilical) was used, qualified for more aggressive scenarios in terms of fatigue (catenaries). In this way, it was designed that each EHU will be able to provide up to 4 drive rings to the DLBM.

At the ends of the umbilicals, terminations structures are installed, to ease the connections with path tubings connected to the upper and lower ends of the umbilical, in addition to protect the thermoplastic hoses from weather and ultraviolet rays.

On the topside of the platform, the circuit is interconnected in an individual drive panel, which in turn is powered by the platform's HPU, allowing the remote driving of each bell mouth individually. It is worth to highlight that said panel will be provided with mechanisms to avoid the spurious driving of the DLBM-SI (Standard Interface).

The invention claimed is:

1. A diverless bell mouth system comprising:

a body defining a central passage to receive and release a helmet of a bend stiffener;

a hydraulic actuation system arranged and configured to conduct pull-out operations with the helmet of the bend stiffener without use of a diver or a ROV, wherein the hydraulic actuation system comprises at least one single-acting, spring-return hydraulic actuator that is remotely activated, the at least one single-acting, spring-return hydraulic actuator comprises a hydraulic inlet and outlet, a piston, a first rod having a first diameter, and a second rod having a second diameter larger than the first diameter, and the hydraulic inlet and outlet are connected in the same line so that the piston moves by difference in areas between the first rod and the second rod; and locking pawls configured to be actuated by the at least one single-acting, spring-return hydraulic actuator between a spring-loaded locking position for pull-in operations and a hydraulically driven retracted position for pull-out operations, wherein the locking pawls transfer a load from the helmet to the body when in the locking position.

2. The diverless bell mouth system of claim 1, wherein the body has one of the following three sizes: 32" for umbilicals, or 46" or 48" for flexible risers for production, service, and injection of gas or water.

3. The diverless bell mouth system of claim 1, wherein the hydraulic actuation system comprises one of the at least one single-acting, spring-return hydraulic actuator for each locking pawl.

4. The diverless bell mouth system of claim 1, wherein the hydraulic actuation system has hydraulic power supplied by lines coming from a platform, the lines arranged to drive the hydraulic actuation system and the locking pawls between the locking position and the retracted position.

5. The diverless bell mouth system of claim 4, wherein the hydraulic actuation system comprises:

one of the at least one single-acting, spring-return hydraulic actuator coupled to each locking pawl, each single-acting, spring-return hydraulic actuator arranged to move in unison with the locking pawl each single-acting, spring-return hydraulic actuator is coupled to, and each single-acting, spring return hydraulic actuator comprising a cylinder defining the hydraulic inlet and outlet.

6. The diverless bell mouth system of claim 1, wherein the hydraulic actuation system comprises a hydraulic power unit located remotely from the body.

* * * * *